Patented Jan. 6, 1925.

1,521,749

UNITED STATES PATENT OFFICE.

HENRY H. BUCKMAN, OF JACKSONVILLE, FLORIDA, AND GEORGE A. PRITCHARD, OF NEW YORK, N. Y., ASSIGNORS TO BUCKMAN & PRITCHARD, INC., OF JACKSONVILLE, FLORIDA, A CORPORATION OF FLORIDA.

HIGHLY-REFRACTORY ARTICLE.

No Drawing. Original application filed March 1, 1921, Serial No. 448,899. Divided and this application filed July 6, 1922. Serial No. 573,227.

*To all whom it may concern:*

Be it known that we, HENRY H. BUCKMAN, a resident of Jacksonville, Florida, and GEORGE A. PRITCHARD, a resident of New York, N. Y., and being both citizens of the United States, have jointly invented certain new and useful Improvements in Highly-Refractory Articles, of which the following is a specification.

Our present invention relates to such highly refractory, usually heat-compacted, materials, or compositions of materials, as are by reason of their refractory properties, or otherwise, useful for many purposes and especially in arts involving application of very high temperatures to elements, compounds or other substances in order to convert them into various desired products, among the principal uses of the said highly refractory materials being construction, or preparation, therefrom of furnaces, retorts, muffles, crucibles and the like, or the walls, or other parts, thereof, or their application as cementing agents to the repair of such vessels; and the objects of our invention comprise the provision of a material, or materials, or composition of materials, and a method of utilizing the same, whereby, with greater economy and certainty than heretofore, there is, among other desiderata, impartable to such appliances increased resistance to high temperatures, and to the passage therethrough, or thereover, of the electric current; corresponding durability; exceptional stability; and capacity for being effectively and readily repaired and maintained, our present application for patent being a division of our pending application, Serial Number 448,899, filed March 1st, 1921, now U. S. Letters Patent No. 1,440,766 dated January 2, 1923.

We are aware that the use of zirconium oxide ($ZrO_2$) has been heretofore suggested as desirable for somewhat similar, or analogous, purposes, but we believe that we are the first to have conceived, and by our researches and tests to have demonstrated, that zirconium silicate ($ZrSiO_4$), commonly known as zircon, or sometimes as hyacinth, jargon, etc., and preferably as produced by nature, or even also as synthethically produced, behaves, in several important respects, in a markedly and usefully different manner from said oxide, when subjected to the action of carbon, or other reagents, at the high temperatures referred to. For whereas under such conditions the oxide appears to be too readily, or prohibitively, attacked and its identity destroyed by the carbon, or other reagents, the silicate is comparatively only moderately, usually only negligibly, so attacked at even extremely high, or comparatively much higher, temperatures.

Our collaboration in this field has now, we believe, firmly established that zircon, i. e. zirconium silicate, ($ZrSiO_4$) possesses, by itself, an unprecedented combination of useful qualities, or properties, chief of which are: (1) exceptional chemical inertness even at very high temperatures; (2) a very high melting point—so high, indeed, as to have proved hitherto undeterminable accurately by us; (3) an extremely low co-efficient of expansion; (4) a great resistance to the passage of the electric current, therethrough, or thereover, and even at high temperatures; (5) a great resistance to the passage, or transmission, therethrough of heat; (6) a remarkable capacity for autocementation, or agglomeration, when reduced to a state of fine comminution.

Our researches and tests have also demonstrated that when thus finely comminuted zircon, or zirconium silicate, is, as preferable, mixed with water, or other suitable liquid, or moisture-impartive, vehicle, and made, as per well-known procedures, into a "batch" from which, owing, in part, to above referred to autocementative, or agglomerative, properties, can be fashioned shapes, that even moderate heating, for example at temperatures even as low as about 800° C., will sufficiently stiffen, or cause these shapes to be heat-compacted, or baked to a hard, durable, mass, although the true fusion temperature, or the melting point of the material is much higher. It is not necessary that the entire mass of zircon, or zirconium silicate, used be very finely comminuted, so long as a substantial portion is in this condition. But when zircon, or zirconium silicate, is to be used by itself alone in production of our novel highly refractory products, it is highly preferable, if not essential, that at least part of it be finely comminuted.

If it is to be used in association with other constituents of our highly refractory material, or final product, as hereafter referred to, this function of a binding agent may be performed either by a certain amount of finely comminuted zircon, or by one of the other materials.

In order to describe more fully our invention and to enable others skilled in the art to practice it, we here give the following several examples of our procedure.

When we desire our highly refractory articles, or final products, to be composed, or to consist, of zircon, or zirconium silicate, by itself, or essentially by itself, unassociated with other thereto designedly added material, we take twenty-five per cent of zircon which is in the form of particles, i. e. which is naturally, or has been, finely comminuted (say for example to 200 mesh, or smaller), and mix it thoroughly with coarser zircon (say 90 mesh or larger). If a pressure mold is to be employed, we prefer, though not absolutely necessary, to use a very little water, or other moisture-impartive medium, with the mix, or batch, i. e. just about sufficient to insure a thorough distribution of the more finely comminuted zircon, or zirconium silicate, over the surface of, and interstitially between, the larger particles. The shapes produced by usual procedures as, for example, in pressure molds, from this novel batch we dry, and usually fire so as to heat-compact the components thereof, as per any one of the several usual and well-known procedures of the art thus imparting greater shape-retentiveness to the conglomeration of constituent material. If a pressure mold is not to be employed, we prefer to use sufficient water, or other suitable liquid, or moisture-impartive, vehicle in the mix to so moisten the batch as to insure not only a proper distribution of the finely divided zircon throughout the mass, but also a proper working consistency. This is also the case when we desire to use our highly refractory material as a refractory cement, applied to where indicated while plastic as by trowelling, etc., and thereafter dried in place.

We have found that, depending upon the particular art in which it is used, our novel highly refractory material, or products, may best be composed either wholly of zircon, or zirconium silicate, as above described, or also, in many other cases, or for special uses as, for example, in the manufacture of those well-known products known as "ceramic wares", or "ceramics", it may advantageously be mixed, or associated with, or, to an extent substituted for, other materials, including several of those already employed in the art for analogous purposes as, for example, for the china clay, or kaolin, or flint, or other usual constituents of said ceramics. But in all cases we have, thus far, found it preferable, if not essential, to have at least five per cent, by weight, of zircon, or zirconium silicate, present in the final product.

Examples of our above referred to employment of zircon, or zirconium silicate, with associated materials are, among others, as follows:—We sometimes compose our highly refractory articles, or ceramic products, of zircon, or zirconium silicate, associated with a compound of aluminium, to wit: a solid inorganic compound of that metal, such as an oxygen, or a silicon, compound thereof. To this end, in the latter instance, we select, for example, a suitable clay, say one composed importantly of an aluminium silicate, and intimately mix it with, as above described, finely comminuted and coarser zircon in such proportions that the finely comminuted zircon will be to the coarser zircon as about one to three, and the total zircon to the aluminium compound will be about as one to one. Other proportions, including those relative to other constituents of the final product, may, as indicated by the particular use designed, be also used as will readily be apparent to those skilled in the art. Our procedure from this point to the manufacture of shapes, or of cements, follows that above described.

In other cases respectively, or for special purposes respectively, we similarly, and by the same procedures, permanently associate the zircon, or zirconium silicate, in our highly refractory material, or products, with respectively the following substances, elements, or compounds, i. e. with carbon in one of its refractory forms (preferably graphite), or with a refractory carbide (preferably carborundum).

In each of the above specified composite forms of our invention involving association of the zircon with other substances, our researches indicate that the zircon behaves differently, and desirably, as compared with other substances, or reagents, hitherto employed in lieu thereof in such products. We also in some cases have found it advantageous to use any usual such batch as may be employed in production of refractory materials of the kind and for the purposes referred to and add thereto a greater or less proportion of zircon, or zirconium silicate, treated as above.

The term zircon employed in our hereinafter made claims is to be understood in each instance as referring to a chemical combination of zirconium, silicon and oxygen designatable by the formula $ZrSiO_4$ and irrespective of its origin being synthetic or natural.

Having now described our invention, what we claim as new and desire to secure by Letters Patent is the following, viz:

1. As a new article of manufacture, a highly refractory material containing natural zircon ($ZrSiO_4$) and carbon in its graphitic form as a permanent constituent thereof.

2. As a new article of manufacture a highly refractory material permanently containing carbon in its graphitic form, and also a chemical compound of natural zircon.

3. As a new article of manufacture, a highly refractory material composed essentially of a burnt mixture of natural zircon and graphite in substantially equal proportions.

4. As a new article of manufacture a highly refractory material composed of carbon in one of its refractory forms mixed with zircon, the greater part of said zircon being in the form of relatively large, or coarse, particles between which is interstitially contained smaller zircon particles.

5. As a new article of manufacture a highly refractory material composed of carbon in one of its refractory forms mixed with zircon, the zircon being in the form of particles, the majority of which are not less than 90 mesh in size and between which are interstitially disposed zircon particles of not more than 200 mesh in size.

6. As a new article of manufacture a highly refractory material composed of a mixture of a zircon with refractory carbon in substantially equal proportions, the zircon being in the form of a conglomeration of finely comminuted particles thereof contained interstitially between and compacted with coarser particles thereof and with said carbon.

7. The method of making a refractory composition of matter which comprises obtaining, as by comminuting, zircon in the form of particles, the majority of which are of greater size, or mesh, than the remainder; mixing said particles of zircon with each other and with carbon in one of its refractory forms; adding to the mixture a moisture impartive vehicle in quantity such as to render it plastic, and subjecting the mixture to temperature below the melting point thereof but sufficient to stiffen, or heat-compact, it.

8. The method of making a refractory composition of matter which comprises obtaining, as by comminuting, zircon in the form of particles, the majority of which are in size not less than 90 mesh and the remainder in size not greater than 200 mesh; mixing said particles of zircon with each other and with carbon in one of its refractory forms; adding to the mixture a moisture impartive vehicle in quantity such as to render it plastic, and subjecting the mixture to temperature below the melting point thereof but sufficient to stiffen or heat-compact, it.

9. As a new article of manufacture, a highly refractory material composed essentially of a burnt mixture of zircon and graphite in substantially equal proportions.

HENRY H. BUCKMAN.
GEORGE A. PRITCHARD.